June 20, 1933.  A. F. M. RAGG  1,915,201
METHOD AND APPARATUS FOR PRODUCING MIXTURES CONTAINING METAL POWDER
Filed Oct. 10, 1927
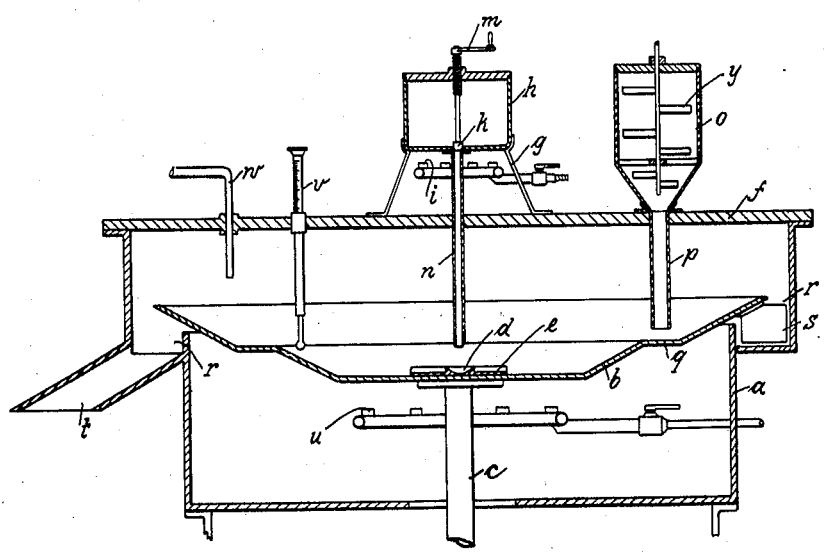
Inventor:
A. F. M. Ragg.
By Langner, Parry, Card & Langner
Attys.

Patented June 20, 1933

1,915,201

UNITED STATES PATENT OFFICE

ALPHONSE FRIEDRICH MANFRED RAGG, OF WENTORF IN HOLSTEIN, GERMANY, ASSIGNOR OF ONE-HALF TO JOHN FRANK RAHTJEN, OF ALTONA-OTTENSEN, GERMANY

METHOD AND APPARATUS FOR PRODUCING MIXTURES CONTAINING METAL POWDER

Application filed October 10, 1927, Serial No. 225,377, and in Germany October 28, 1926.

It has heretofore been proposed to admix finely distributed metals, such as zinc, aluminum or lead, with the other ingredients of rust-preventing paints. The mixing operation, save in the case where the production of metal powder is effected by condensing metal vapors, for instance zinc vapors, is difficult of performance, particularly when the metal is tough, e. g., in the case of lead and certain amalgams.

A known method of producing lead pigment consists in converting pieces of lead into a mixture of lead dust and low oxides of lead by subjecting such pieces to purely mechanical rubbing action by means of steel balls and similar disintegrating bodies within rotating drums at a temperature of 200° C., while air is blown there-against. This method has the serious objection that it proceeds very slowly, that it requires a considerable amount of power, and that the material produced is chemically active so that it ignites spontaneously in the air. According to another known method of producing metal powder, molten metal is mixed intimately with powdered inorganic material until the temperature of the mixture sinks below that of solidification of the metal, whereupon the removal of the admixture is effected by washing or by the aid of solvent. Metal powders which are produced in this way have been used particularly for soldering and metallizing purposes and in pyrotechnics.

Metal pigments which are intended to be used in rust-preventing paints should possess qualities which are never possessed by powders produced by the last named method. It is demanded of rust-preventing pigments on the one hand that they have a maximum superficial area, and on the other hand they should not be too highly dispersed inasmuch as there is no guarantee of the solidification of the film of paint if too finely distributed. The large superficial area is a desideratum because not only does intimate contact with the oil or vehicle (colour or paint adhesive) result, but any chemical reaction involved is accelerated and the paint is prevented from deposition, decomposition and the like.

The metal powders used heretofore do not answer requirements, which are only done justice to by a pigment which has a sponge-like structure, so that the spaces between a non-metallic pigment are filled up by the metal, a conglomerate of metal and powder being formed and the internal surface being considerably increased.

By this formation of conglomerates noxious interspaces filled up by oil or other vehicles, which is always more or less water absorbing, are reduced to a minimum.

The formation of metallic conglomerates or sponges according to this invention is obtained as follows: Molten metal is sprayed in a manner as known per se. The metallic dust, which consists of finely divided drops, is mixed with a solid powder and cooled at the same time. In this way a metal-containing sponge-like pigment is formed from the setting metal and the powder of a pigment, in which the particles of the admixed powder are united with the setting metal to a sponge-like or coral-like conglomerate.

For producing pigments as described and suitable for anticorrosive purposes it is necessary:

1. That the admixed powders or pigments which later on are to form an integral part of the paint are suitable to be used in anticorrosive paints and not detrimental to the surface to be protected and that these powders or pigments are adapted to form conglomerates with increased internal surface f. i. oxides of aluminium, zinc and titanium; silicates, such as asbestine; graphite etc.

2. That the metal is not added to the powder as a coherent molten body, but should be finely dispersed in a molten state at a temperature above the melting point of the metal, and at this temperature thoroughly mixed with the powder and afterwards cooled below the melting point of the metal. In this way it is possible to produce in a single operation pigments of a spongy character and of such fineness that they can be directly used for painting purposes. It is understood that the term "metal" is used in a comprehensive sense to include not only metals in their elementary state, but also metallic alloys.

It is understood that the term "metal" is used in a comprehensive sense to include not only metals in their elementary state, but also metallic alloys.

The method described above may be carried out in a vacuum or in a neutral or reducing atmosphere or in an enclosed casing into which air is allowed to enter at a diminished rate or by degrees. In the latter instance superficial oxidation of the oxidizable metal takes place and the result will be a pigment consisting of metal, oxides and an admixed powder. Since for certain purposes, for instance in the case of lead, the presence of a certain amount of low oxides is a desideratum in rust-preventing paints, by regulating the admission of air or by introducing suitable liquids or gaseous reducing means mixtures may be produced which embody a percentage of low oxides.

The method is particularly well adapted for producing lead pigments. By the method described metallic poisonous paints for the hulls of ships can also be produced, if molten copper amalgam is atomized and saturated in suitable foundations; moreover, pastes for storage batteries may be made by atomizing lead or lead oxide. Other ways of utilizing the method may suggest themselves. While the invention is not limited to the employment of any particular apparatus for atomizing the metal, the apparatus described hereinafter has been found well adapted for the purpose.

In the accompanying drawing apparatus adapted to carry out the invention is shown in vertical section.

Rotatably mounted within a preferably cylindrical casing $a$ is a stepped horizontal disk or dish $b$ on a vertical shaft $c$. The disk or dish $b$ is provided with a central cup $d$ from which radial furrows $e$ branch off. The cup $d$ as well as the furrows $e$ may be let into the disk $b$ or may be produced by cutting into the latter. The casing $a$ is provided with a cover $f$ on which rest feet $g$ of a vessel $h$ adapted to be filled with molten metal or in which metal may be melted by the aid of a gas burner $i$. The bottom of the vessel $h$ has a central outlet which may be closed by a valve $k$ and from which projects downwardly a pipe $n$ terminating just above the cup $d$ in the centre of the disc $b$. The flow of the molten liquid is regulated by the valve $k$, the spindle of which is screwed into the cover or top of the valve $k$ and is provided at its upper end with means for rotating the valve spindle, for instance a crank $m$, to regulate the valve, so as to allow the metal to flow into the cup $d$, either in a fine jet or in drops.

At some distance from the centre a second vessel $o$ is mounted on the cover or top $f$ for the reception of the filling material, for instance a pigment or the like, to be mixed with the metal. A pipe $p$ extends down from the vessel $o$ into the casing $a$, ending just above a stepped part $q$ of the disc $b$. Below the rim of the disc $b$ is an annular channel $r$ into which projects or project one or more scrapers $s$ attached to the disc $b$, whereby to convey any material that has been gathered in the channel $r$ to the outlet $t$. Means, for instance a gase burner $u$, is provided to heat the disc $b$.

The operation is as follows:

The vessel $h$ is filled more or less with the metal to be distributed and the vessel $o$ with a powdery material, for instance pigment, to be mixed with the metal. Before the valve $k$ is opened by the crank $m$, powder from the vessel $o$ is allowed to pass out by the pipe $p$ to the stepped part $q$ of the disc $b$, while rotating, so as when the valve $k$ is opened to allow molten metal to be introduced into the cup $d$ and be distributed all round by the furrows $e$; then by the rotation of the disc $b$, the metal finds a certain amount of powder on the step $q$, with which it mixes, and by the continued rotation of the disc $b$ the mixture is forced to pass over the rim of the disc $b$ and gather in the channel $r$, whence it is finally conveyed to the spout $t$, from which the material is taken away for further treatment. By way of example, on starting, 100 kilograms of lead are introduced into the vessel $h$ and 20 kilograms of pigment, for instance zinc oxide, into the vessel $o$. The speed of the rotating disc may be 1000 revolutions per minute.

Within the vessel $o$ is an agitator $y$ which may be rotated by any well known means.

From the top $f$ of the casing a thermometer $v$ may be suspended so that the temperature within the casing or above the disc may be read off from outside. Another pipe $w$ may be provided for allowing neutral or reducing gas to be fed into the casing when found advisable.

Instead of filling the vessel $o$ with a powdery material, under certain circumstances, for instance when producing paints, a suitable oil, such as varnish or linseed oil or the like, may be used. The feed pipe $p$ will preferably be arranged near the cold wall.

By the method described above it is possible to produce a pigment of such fineness as is required for painting purposes. The production of such pigments is carried on in a continuous run.

I claim:—

1. The method of producing metal containing pigments, comprising atomizing molten metal and projecting it against finely distributed solid ingredients adapted for anticorrosive paints, cooling below the melting point of the metal, and forming conglomerates of finely divided metal and solid ingredients.

2. A method of producing metal-containing pigments, comprising carrying out the steps of claim 1 in an atmosphere deterring oxidation.

3. A method of producing metal containing pigments comprising carrying out the step of claim 1 in a reducing atmosphere.

4. A method of producing pigments consisting of spongy conglomerate of finely divided metal with finely divided powdery material adapted for anticorrosive paints comprising melting metal, atomizing the molten metal by centrifugal force and causing it to come into contact with the said powdery material.

5. A method of producing metal containing pigments comprising atomizing molten metal by causing a jet of it to impinge against a rotating surface, thus centrifugally dispersing the metallic particles, and placing a finely divided solid material adapted for anticorrosive paints in the path of movement of the dispersed metal.

In testimony whereof I have signed my name to this specification.

ALPHONSE FRIEDRICH MANFRED RAGG.